(12) United States Patent
Murata

(10) Patent No.: US 8,657,367 B2
(45) Date of Patent: Feb. 25, 2014

(54) VEHICLE LOWER STRUCTURE

(75) Inventor: Masaya Murata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/447,965

(22) Filed: Apr. 16, 2012

(65) Prior Publication Data

US 2012/0267918 A1 Oct. 25, 2012

(30) Foreign Application Priority Data

Apr. 20, 2011 (JP) ................. 2011-094246

(51) Int. Cl.
B62D 25/20 (2006.01)

(52) U.S. Cl.
USPC ...................... 296/193.07; 296/204

(58) Field of Classification Search
USPC ................. 296/182.08, 193.02, 193.07, 204; 280/795, 796, 781, 789
See application file for complete search history.

(56) References Cited

U.S. PATENT DOCUMENTS

| 5,685,599 A * | 11/1997 | Kitagawa ...................... 296/204 |
| 7,648,195 B2 * | 1/2010 | Stock-Hausen-Petersen et al. ............................. 296/204 |
| 2004/0155449 A1 * | 8/2004 | Hashimura ................... 280/785 |
| 2006/0175872 A1 * | 8/2006 | Wada ........................ 296/193.07 |
| 2010/0187864 A1 * | 7/2010 | Tsuchida ................. 296/193.07 |
| 2011/0068606 A1 * | 3/2011 | Klimek et al. ........... 296/187.08 |
| 2012/0306238 A1 * | 12/2012 | Midoun et al. ................ 296/204 |

FOREIGN PATENT DOCUMENTS

| JP | 2004299599 A | 10/2004 |
| JP | 2006051839 A | 2/2006 |
| JP | 2008-279951 A | 11/2008 |
| JP | 2009029244 A * | 2/2009 |

* cited by examiner

*Primary Examiner* — Jason S Morrow
(74) *Attorney, Agent, or Firm* — Gifford, Krass, Sprinkle, Anderson & Citkowski, P.C.

(57) ABSTRACT

A vehicle lower structure is equipped with a brace. The brace is configured to include an extension portion that extends in a vehicle width direction, and link portions that are provided at both ends of the extension portion respectively and have a generally V shape in a bottom view in such a manner as to be convex forward or rearward with respect to a vehicle body. The vehicle lower structure also has a body portion that is fastened to mounting portions, which are provided on both sides of a lower portion of a vehicle respectively, by the link portions.

11 Claims, 9 Drawing Sheets

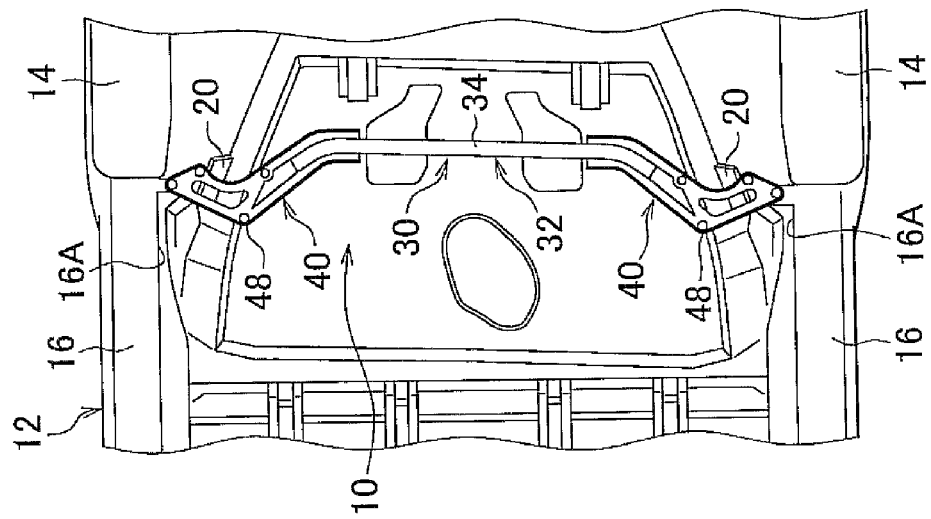
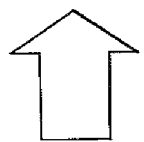
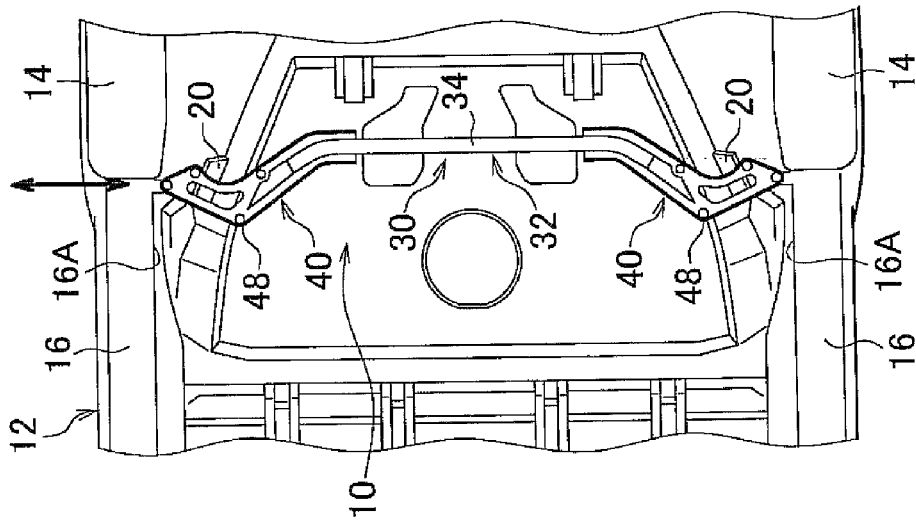

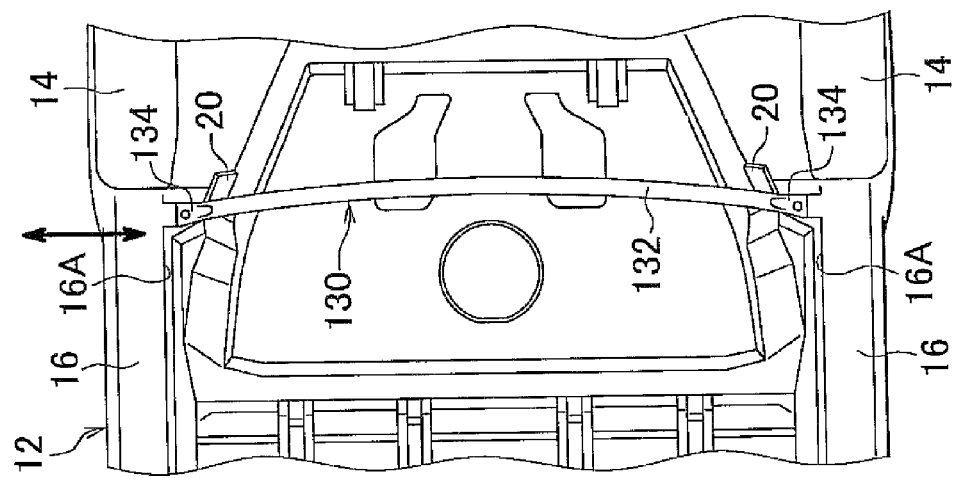
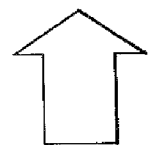
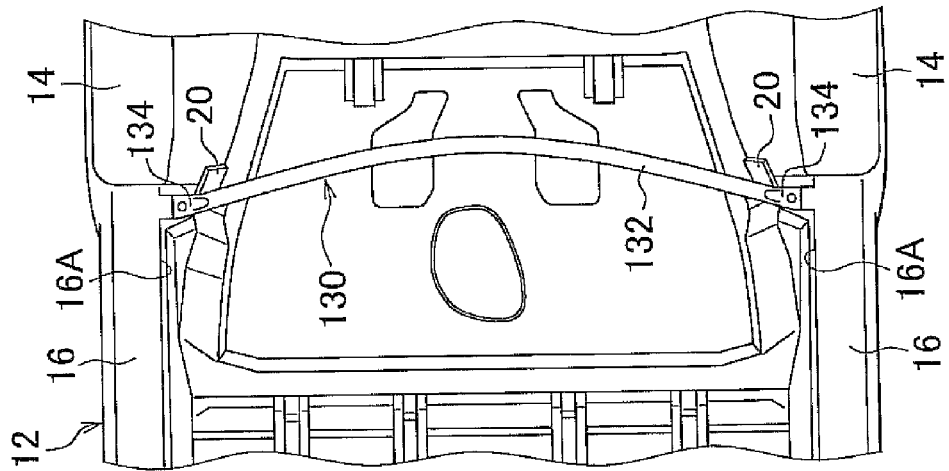

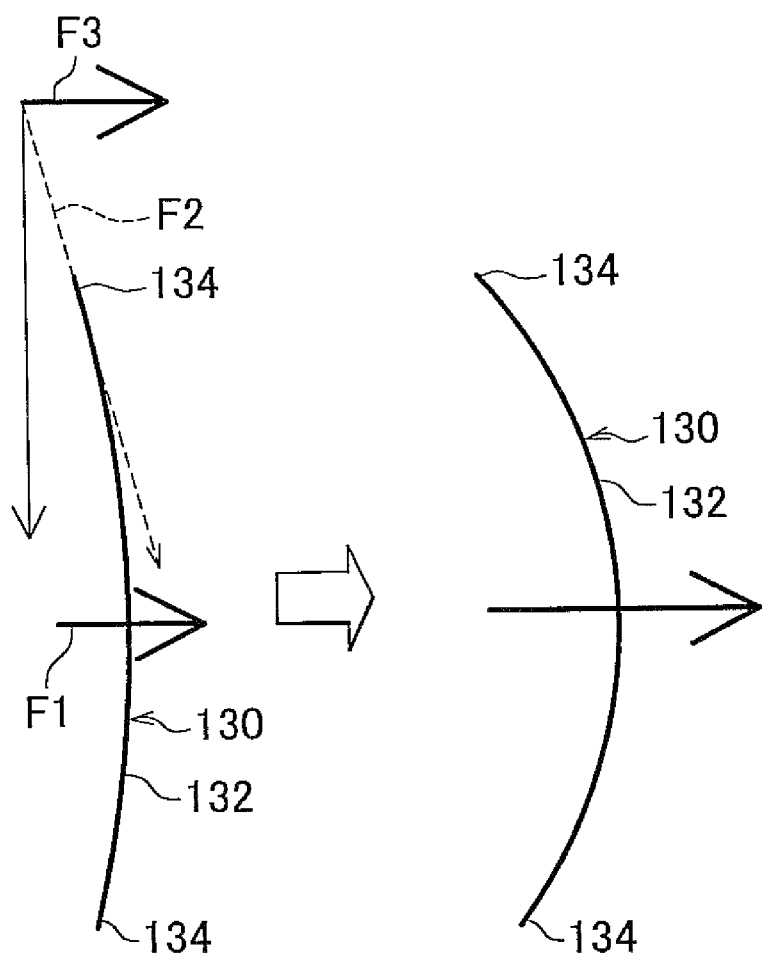

VEHICLE LOWER STRUCTURE

CROSS REFERENCE TO RELATED APPLICATIONS

This application claims priority to Japanese Patent Application No. 2011-094246 filed on Apr. 20, 2011, which is incorporated herein by reference in its entirety including the specification, drawings and abstract.

BACKGROUND OF THE INVENTION

1. Field of the Invention

The invention relates to a lower structure of a vehicle such as an automobile or the like.

2. Description of Related Art

Trailing arm brackets are provided on both sides of a lower portion of a vehicle in a vehicle width direction, respectively. A tank lower brace that is utilized to ensure the rigidity of these trailing arm brackets in the vehicle width direction (which is also referred to as a lateral direction) is conventionally known. The longitudinal direction of this brace coincides with the vehicle width direction. This brace is arranged below a fuel tank in a vertical direction of a vehicle body, and each of both ends of the brace in the vehicle width direction is mounted across a corresponding one of the trailing arm brackets and a corresponding one of rockers (e.g., see Japanese Patent Application Publication No. 2008-279951 (JP 2008-279951 A)).

In some cases, however, there is no choice but to curve both the ends of this brace in the vehicle width direction forward with respect to the vehicle body, due to a positional relationship between the brace and the fuel tank. In the case where both the ends of the brace in the vehicle width direction are curved forward with respect to the vehicle body, the brace is urged to be deformed to be bent rearward with respect to the vehicle body, so that the lateral rigidity of the trailing arm brackets may not be ensured. As described hitherto, there is still room of improvement in the brace for ensuring the lateral rigidity of mounting portions (the trailing arm brackets) that are provided on both the sides of the lower portion of the vehicle respectively. It should be noted that the lateral rigidity of the trailing arm bracket means the rigidity of the trailing arm bracket against a load applied in the lateral direction.

SUMMARY OF THE INVENTION

Thus, in view of the foregoing circumstances, the invention provides a vehicle lower structure that enables to ensure rigidity of mounting portions, which are provided on both sides of a lower portion of a vehicle respectively, in a vehicle width direction.

A vehicle lower structure according to an aspect of the invention is equipped with a brace. The brace is configured to include an extension portion that extends in a vehicle width direction, and link portions that are provided at both ends of the extension portion respectively and have a generally V shape in a bottom view in such a manner as to be convex forward or rearward with respect to a vehicle body. The vehicle also has a body portion that is fastened to mounting portions, which are provided on both sides of a lower portion of a vehicle respectively, by the link portions.

In the vehicle lower structure of the aspect of the invention, in the case where each of the link portions of the brace is formed in a generally V shape in a bottom view in such a manner as to be convex forward with respect to the vehicle body, when the extension portion of the brace is urged to be deformed to be bent rearward with respect to the vehicle body, a force that acts reversely to the direction of the bending deformation is applied to each of the link portions. By the same token, in the case where each of the link portions of the brace is formed in a generally V shape in a bottom view in such a manner as to be convex rearward with respect to the vehicle body, when the extension portion of the brace is urged to be deformed to be bent forward with respect to the vehicle body, a force that acts reversely to the direction of the bending deformation is applied to each of the link portions. Accordingly, even when the brace is urged to be deformed to be bent forward or rearward with respect to the vehicle body, the bending deformation can be restrained, and the rigidity of the mounting portions, which are provided on both the sides of the lower portions of the vehicle respectively, in the vehicle width direction can be ensured.

Further, in the vehicle lower structure of the foregoing aspect of the invention, the body portion may be a rocker, and the mounting portions may be trailing arm brackets.

In the vehicle lower structure of the foregoing aspect of the invention, each of the trailing arm brackets is fastened to the rocker by a corresponding one of the link portions of the brace. Therefore, the rigidity of the trailing arm brackets, which are provided on both the sides of the lower portion of the vehicle respectively, in the vehicle width direction can be ensured.

Further, in the vehicle lower structure of the foregoing aspect of the invention, the extension portion may be equipped with a linear portion that extends along the vehicle width direction, and bent portions that are bent forward or rearward with respect to the vehicle body at both ends of the linear portion respectively, and the link portions may include the bent portions, and may be fixed to the extension portion.

In the vehicle lower structure of the foregoing aspect of the invention, each of the link portions includes the bent portions that are bent forward or rearward with respect to the vehicle body at both the ends of the line portion that extends along the vehicle width direction, and is fixed to the extension portion. Therefore, the rigidity of the brace against forward or rearward bending deformation with respect to the vehicle body can be enhanced.

Further, in the vehicle lower structure of the foregoing aspect of the invention, each of the link portions may be fastened to the trailing arm bracket at a top portion of the generally V shaped link portion, and a virtual extension line of the bent portion that extends outward in the vehicle width direction intersects with a virtual line that connects a fastening point where the rocker is fastened to the link portion to a fastening point where the link portion is fastened at the top portion to the trailing arm bracket.

The vehicle lower structure of the foregoing aspect of the invention is each of the link portions is fastened to the trailing arm bracket at a top portion of the generally V shaped link portion, and a virtual extension line of the bent portion that extends outward in the vehicle width direction intersects with a virtual line that connects a fastening point where the rocker is fastened to the link portion to a fastening point where the link portion is fastened at the top portion to the trailing arm bracket. Therefore, each of the bent portions serves as a resistance member against vibrations that are transmitted substantially parallel to the virtual line. Accordingly, the rigidity of the brace against forward or rearward bending deformation with respect to the vehicle body can be enhanced.

Further, in the vehicle lower structure of the foregoing aspect of the invention, each of the link portions may be fastened, at at least two fastening points in addition to the top portion, to the trailing arm bracket, and a virtual line that connects the two fastening points to each other may extend along the vehicle width direction.

In the vehicle lower structure of the foregoing aspect of the invention, the virtual line that connects the two fastening points where the link portions are fastened except at the top portions thereof to the trailing arm brackets respectively is the line that extends along the vehicle width direction. Therefore, the rigidity of the brace can be ensured against a centrifugal force that is received when the vehicle runs along a curve. Accordingly, the steering stability of the vehicle can be enhanced.

Further, in the vehicle lower structure of the foregoing aspect of the invention, the link portions may be gussets having an open cross-section that is open on a lower side with respect to the vehicle body in such a manner as to cover the extension portion from above.

In the vehicle lower structure of the foregoing aspect of the invention, each of the gussets as the link portions has an open cross-section that is open on the lower side with respect to the vehicle body in such a manner as to cover the extension portion from above. It is therefore easy to fix each of the gussets to the extension portion. Further, owing to the adoption of this open cross-section, muddy water or the like can be restrained or prevented from entering each of the gussets, or a puddle of water can be restrained or prevented from being formed in each of the gussets.

Further, in the vehicle lower structure of the foregoing aspect of the invention, the gussets may be equipped with wall surfaces that cover the extension portion, and the wall surfaces may be shaped along a contour of the extension portion.

In the vehicle lower structure of the foregoing aspect of the invention, the wall surface of each of the gussets that covers the extension portion is shaped along the contour of the extension portion. Therefore, the jouncing between each of the gussets and the extension portion can be restrained or prevented.

Further, in the vehicle lower structure of the foregoing aspect of the invention, at least a portion of the brace may be arranged below a fuel tank.

In the vehicle lower structure of the foregoing aspect of the invention, at least a portion of the brace is suitable as a tank lower brace that is arranged below the fuel tank.

As described above, the vehicle lower structure according to the aspect of the invention can ensure the rigidity of the mounting portions, which are provided on both the sides of the lower portion of the vehicle respectively, in the vehicle width direction.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein:

FIG. 6A is a bottom view showing a state in which a vehicle equipped with the brace according to this embodiment of the invention is shaken;

FIG. 6B is a bottom view showing the brace according to this embodiment of the invention, which is urged to be deformed to be bent;

FIG. 8A is a bottom view showing a state in which a vehicle equipped with a brace according to a comparative example is shaken;

FIG. 8B is a bottom view showing the brace according to the comparative example, which is urged to be deformed to be bent;

FIG. 9A is an illustrative view showing the directions of forces at the time when the brace according to the comparative example is urged to be deformed to be bent; and FIG. 9B is an illustrative view schematically showing the brace according to the comparative example, which is urged to be deformed to be bent.

DETAILED DESCRIPTION OF EMBODIMENT

The embodiment according to the invention will be described hereinafter in detail on the basis of the drawings. It should be noted that an upward direction with respect to a vehicle body, a forward direction with respect to the vehicle body, and an outside in a vehicle width direction are denoted by arrows UP, FR, and OUT respectively in each of the drawings.

Figure 1:
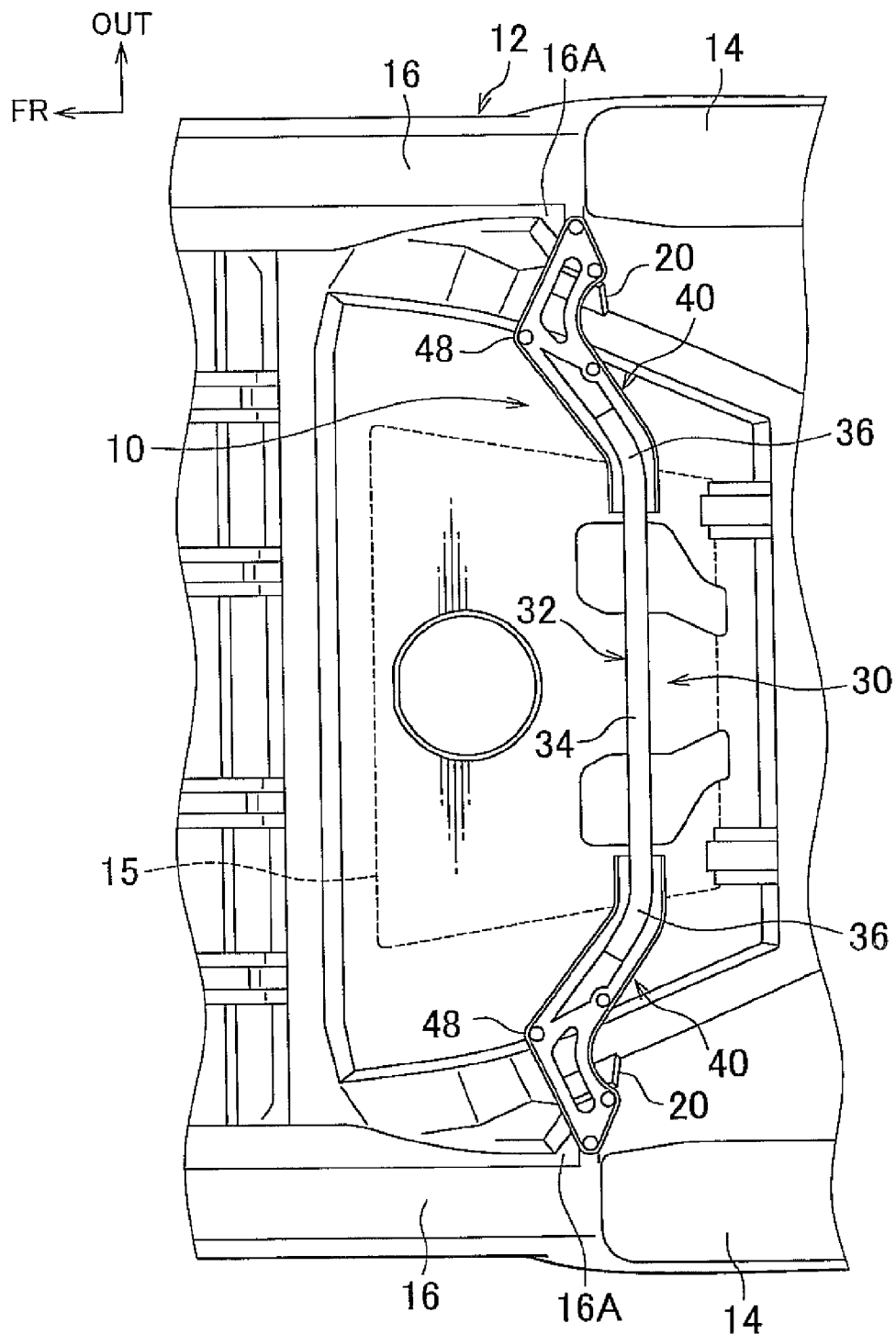
FIG. 1 is a bottom view showing a vehicle lower structure according to this embodiment of the invention.

As shown in FIG. 1, a vehicle lower structure 10 according to this embodiment of the invention is equipped with a brace 30 (which is also referred to as "a steering stabilizing brace" or "a tank lower brace") that is arranged in a lower portion of a vehicle 12 and in front of rear wheels 14 with respect to a vehicle body (and below a fuel tank 15 with respect to the vehicle body). The longitudinal direction of the brace 30 coincides with a vehicle width direction.

Figure 2:
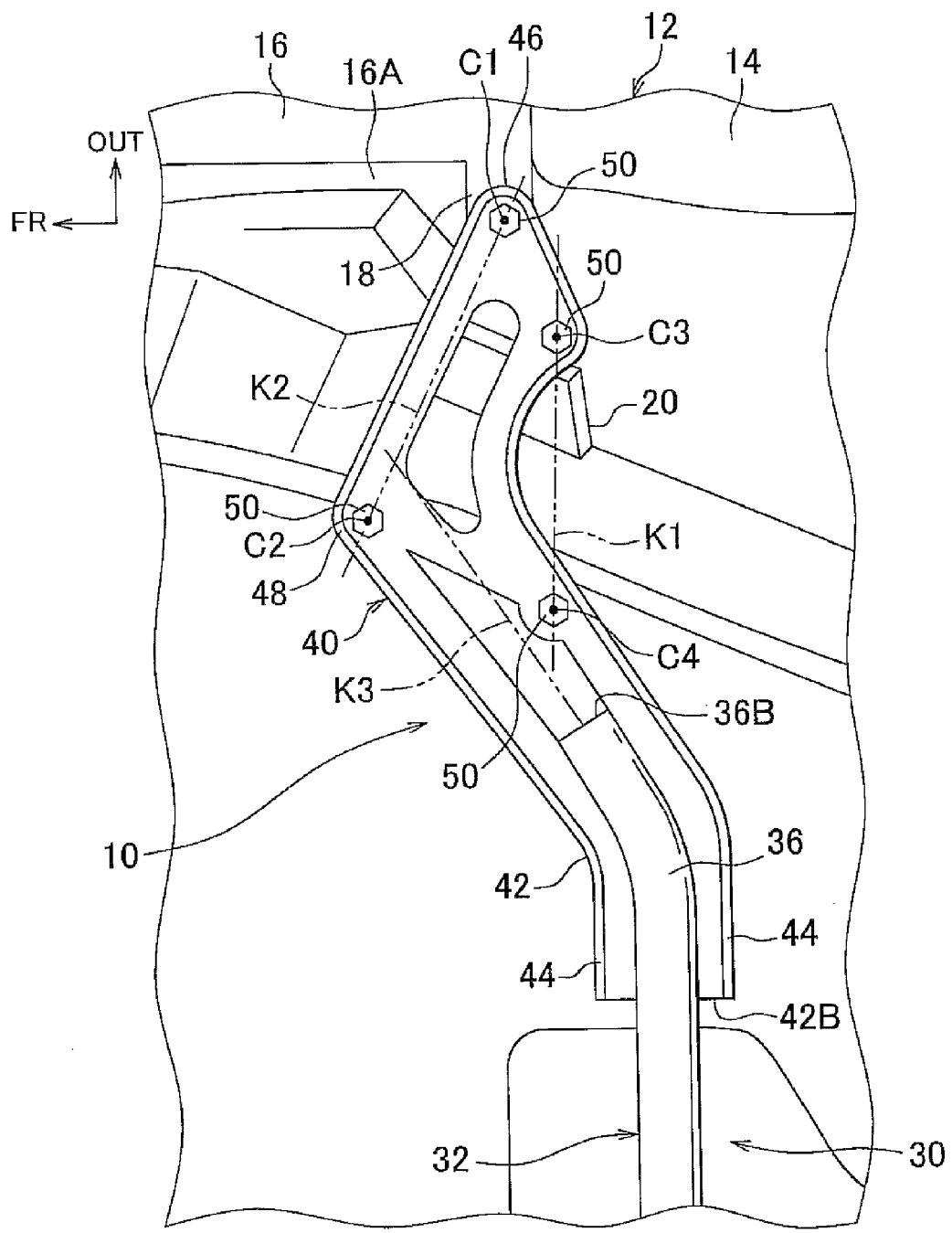
FIG. 2 is a bottom view showing, on an enlarged scale, fastening points where a gusset is fastened to a trailing arm bracket and a rocker.
Figure 3:
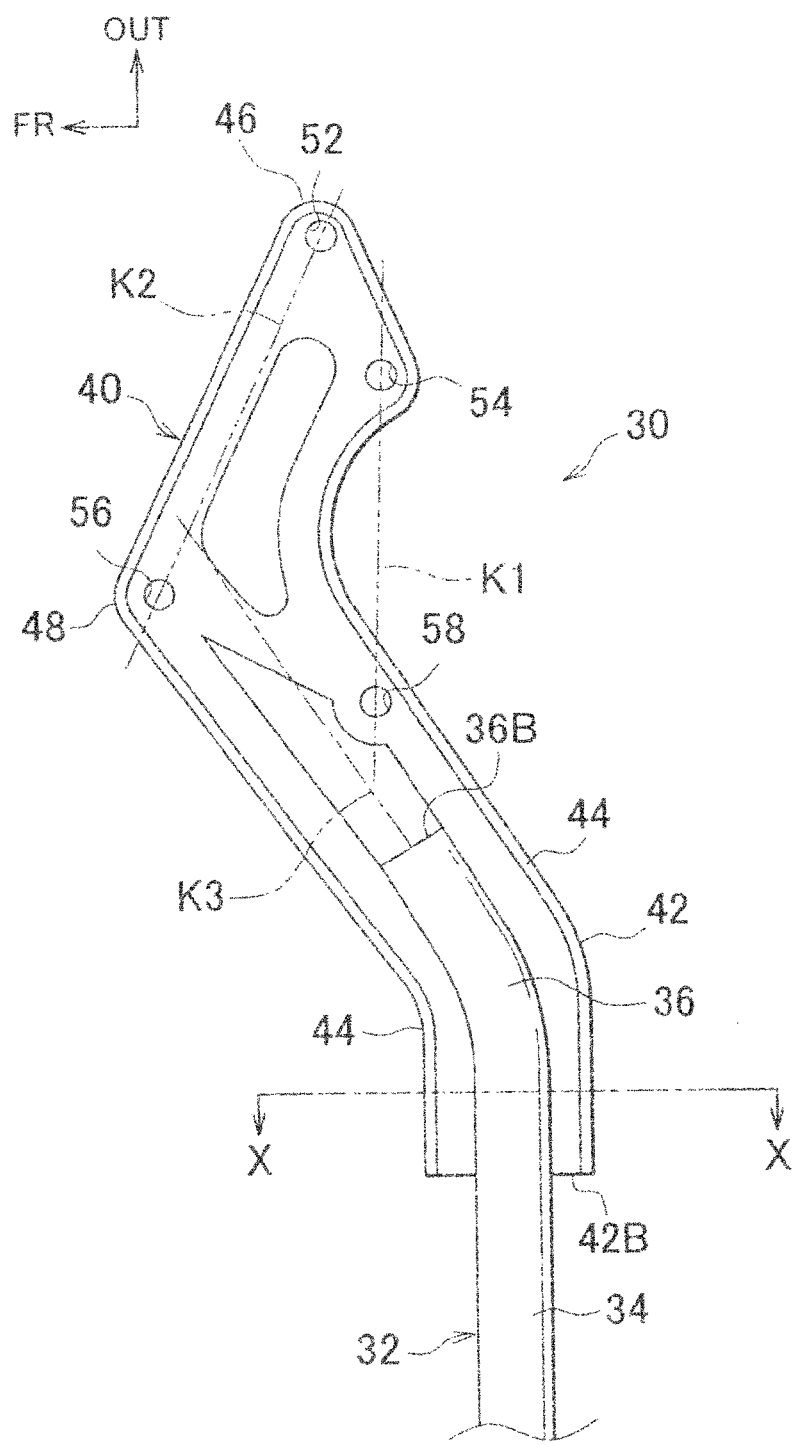
FIG. 3 is a bottom view showing a pipe portion of a brace and the gusset.

As shown in FIGS. 1 to 3, this brace 30 is configured to include a tube-like pipe portion 32 as an extension portion that extends in the vehicle width direction, and gussets 40 as link portions that are provided at both ends of the pipe portion 32 respectively in such a manner as to extend the pipe portion 32 and assume a generally V shape in a bottom view in such a manner as to be convex forward with respect to the vehicle body. The pipe portion 32 is integrally mounted to the gussets 40.

Besides, as will be described later, trailing arm brackets 20 as mounting portions that are provided on both sides of the lower portion of the vehicle 12 respectively are fastened to lower portions of rocker inner panels 16A of right and left rockers 16 as body portions by the gussets 40, respectively. That is, each of the gussets 40 is mounted across a corresponding one of the trailing arm brackets 20 and a corresponding one of the rockers 16 (a corresponding one of the rocker inner panels 16A) (see FIG. 5). The above-mentioned rocker will also be called "side sill".

Thus, as will be described later, the rigidity of the trailing arm brackets 20 in the vehicle width direction is ensured. Further, the steering stability of the vehicle 12 is enhanced. It should be noted that this brace 30 (the pipe portion 32 and the gussets 40) is molded from a metal alloy that exhibits high rigidity against a compressive load in the vehicle width direction such that the right and left rockers 16 of the vehicle 12 can be restrained from being deformed inward in the vehicle width direction (such that the brace 30 becomes unlikely to be deformed to be bent in a longitudinal direction of the vehicle body).

Figure 4:
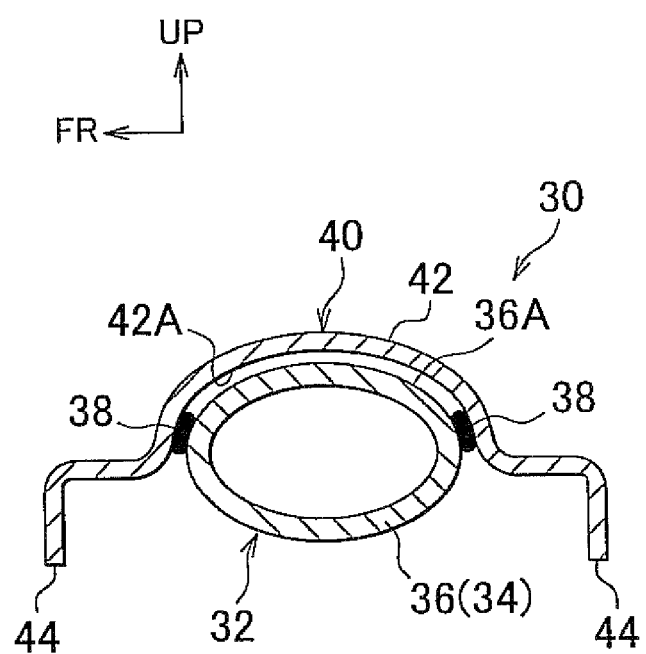
FIG. 4 is a cross-sectional view of FIG. 3 taken along arrows X-X.

As shown in FIG. 4, the pipe portion 32 of the brace 30 is formed with a generally elliptical cross-section or a generally circular cross-section. As shown in FIGS. 2 and 3, the pipe portion 32 of the brace 30 is equipped with a line portion 34 (that is parallel to the vehicle width direction) that extends along the vehicle width direction, and bent portions 36 that are bent forward with respect to the vehicle body on both end sides of the linear portion 34 respectively and extend to avoid interference with the fuel tank 15. Besides, the respective gussets 40 include the bent portions 36, and are fixed to the pipe portion 32.

More specifically, each of the gussets 40 is shaped such that an inner end 42 thereof in the vehicle width direction is bent along a corresponding one of the bent portions 36 in a bottom view shown in FIG. 3 (assumes a bent shape). Further, as shown in FIG. 1, the gussets 40 are fixed to both the ends of the pipe portion 32 such that the pipe portion 32 is constituted only by the line portion 34 between the inner ends 42 in the vehicle width direction. Accordingly, the inner ends 42 of the gussets 40 in the vehicle width direction signify regions where the bent portions 36 of the pipe portion 32 are inside the gussets 40 to overlap therewith.

Further, as shown in FIG. 4, the inner end 42 of each of the gussets 40 in the vehicle width direction has an open cross-section that is open on the lower side with respect to the vehicle body in such a manner as to cover a corresponding one of the bent portions 36 of the pipe portion 32 from above the vehicle body. Besides, a wall surface 42A of the inner end 42 in the vehicle width direction, which covers the corresponding one of the bent portions 36, has a cross-sectional shape that matches a contour (an outer peripheral face 36A) of the bent portion 36 (the pipe portion 32). A lower region of this wall surface 42A with respect to the vehicle body is integrally mounted to the outer peripheral face 36A of the bent portion 36.

It should be noted that both side edge portions 44, which are located below welding portions 38 where the gusset 40 is welded to the pipe portion 32 (the bent portion 36) with respect to the vehicle body, are formed along an entire periphery of the gusset 40 except an inner end face 42B of the inner end 42 of the gusset 40 in the vehicle width direction in such a manner as to spread radially outward of the pipe portion 32 (the bent portion 36) (in a direction perpendicular to an axial direction of the pipe portion 32). Thus, the welding operation becomes easy to perform, and muddy water and the like are unlikely to accumulate in the gusset 40.

Further, as shown in FIG. 3, bolt insertion holes 52, 54, 56, and 58 are formed through the gusset 40 at a plurality of locations (at four locations in FIG. 3) outside an end face 36B of the bent portion 36 of the pipe portion 32 in the vehicle width direction. More specifically, the single bolt insertion hole 52 for fastening the gusset 40 to the rocker 16 (the rocker inner panel 16A), and the three bolt insertion holes 54, 56, and 58 for fastening the gusset 40 to the trailing arm bracket 20 are formed.

The bolt insertion hole 52 for fastening the gusset 40 to the rocker 16 (the rocker inner panel 16A) is formed through an outer end 46 of the gusset 40 in the vehicle width direction. Further, the first bolt insertion hole 54 (the outermost bolt insertion hole with respect to the vehicle body) for fastening the gusset 40 to the trailing arm bracket 20 is formed contiguously to the inside of the bolt insertion hole 52 for fastening the gusset 40 to the rocker 16 (the rocker inner panel 16A) in the vehicle width direction.

Besides, the second bolt, insertion hole 58 (the innermost bolt insertion hole with respect to the vehicle body) for fastening the gusset 40 to the trailing aim bracket 20 is formed on a virtual line K1 that extends past the bolt insertion hole 54 along the vehicle width direction, and close to (in the vicinity of the inner end 42 of the gusset 40 in the vehicle width direction. Further, the third bolt insertion hole 56 (the forwardmost bolt insertion hole with respect to the vehicle body) for fastening the gusset 40 to the trailing arm bracket 20 is formed through the gusset 40 at a top portion 48 that is convex forward with respect to the vehicle body.

Figure 5:
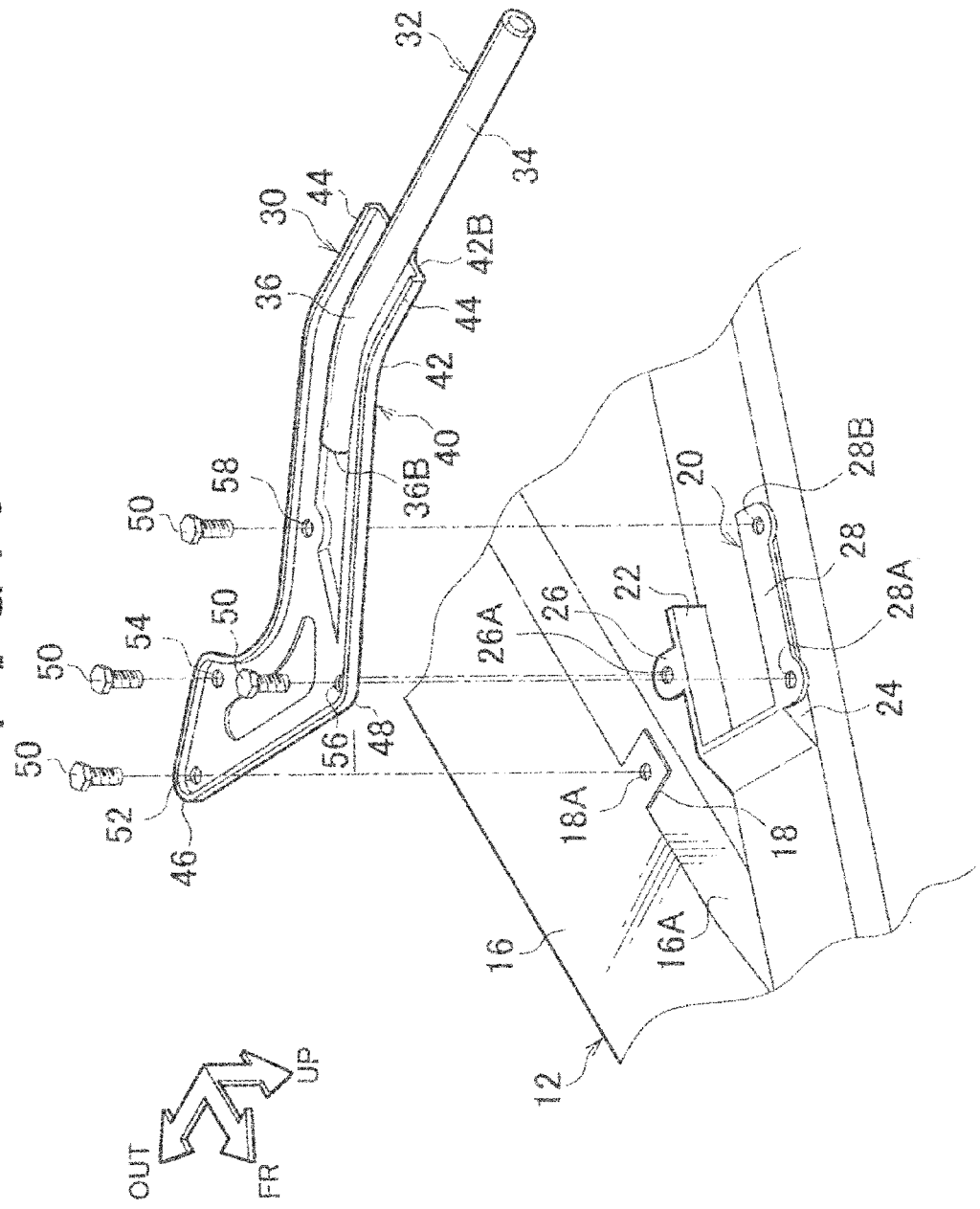
FIG. 5 is an exploded perspective view showing a state prior to the fastening of the gusset to the trailing arm bracket and the rocker.

On the other hand, as shown in FIG. 5, flange portions 18 that bulge inward in the vehicle width direction are formed integrally with the lower portions of the rocker inner panels 16A of the right and left rockers 16 respectively. Besides, a bolt insertion hole 18A that communicates with the bolt insertion hole 52 is formed through each of the flange portions 18.

Further, each of the trailing arm brackets 20 is formed in a generally inverse U shape in a bottom view, and flange portions 26 and 28 that bulge in the vehicle width direction are formed integrally with lower side edge portions of wall portions 22 and 24, which are opposed to each other in the vehicle width direction, with respect to the vehicle body.

Besides, a single bolt insertion hole 26A is formed through the flange portion 26 that bulges outward in the vehicle width direction. Two bolt insertion holes 28A and 28B are formed through the flange portion 28 that bulges inward in the vehicle width direction. That is, the bolt insertion holes 28A and 28B, which are formed through the flange portion 28 that bulges inward in the vehicle width direction, are formed on both end sides of the flange portion 28 in the longitudinal direction thereof (in the longitudinal direction of the vehicle body), respectively.

Accordingly, as shown in FIG. 5, bolts 50 are inserted through the bolt insertion holes 52, 54, 56, and 58 of the gusset 40, and the bolt insertion holes that communicate therewith, namely, the bolt insertion hole 18A of the rocker 16 (the rocker inner panel 16A) and the bolt insertion holes 26A, 28A, and 28B of the trailing arm bracket 20, and are screwed into nuts (not shown). Thus, the gusset 40 is configured to be fastened across the rocker 16 (the rocker inner panel 16A) and the trailing arm bracket 20 (see FIG. 2).

Further, as shown in FIGS. 2 and 3, there is a configuration in which a virtual line K2 that connects a fastening point C1 where the gusset 40 is fastened to the rocker 16 (the rocker inner panel 16A) (the bolt insertion hole 52) to a fastening point C2 where the gusset 40 is fastened at the top portion 48 thereof to the trailing arm bracket 20 (the bolt insertion hole 56) intersects with a virtual extension line K3 of the bent portion 36 that extends outward with respect to the vehicle body.

Further, as shown in FIGS. 2 and 3, a virtual line K1 that connects a fastening point C3 where the gusset 40 is fastened except at the top portion 48 thereof to the trailing arm bracket 20 (the bolt insertion hole 54) to a fastening point C4 (the bolt insertion hole 58) is a line that is parallel to the vehicle width direction (that extends along the vehicle width direction) as described above.

In the vehicle lower structure 10 configured as described above, the operation thereof will be described next. First of all, a comparative example will be described. As shown in FIG. 8A, a brace 130 according to this comparative example is not provided with the gusset 40. Both ends 134 of a pipe portion 132 that are curved forward with respect to the vehicle body to avoid interference with the fuel tank 15 are mounted across the trailing arm bracket 20 and the rocker 16 (the rocker inner panel 16A) respectively.

In order to confirm the rigidity of the trailing arm bracket 20, to which the brace 130 according to this comparative example is mounted, in the vehicle width direction, a shaking test was conducted by shaking the vehicle 12 to which the brace 130 is mounted in the vehicle width direction. FIG. 8A shows a state at the beginning of shaking, and FIG. 8B shows a state after the beginning of shaking. It should be noted that FIG. 8B is illustrated in an exaggerated manner. As shown in this FIG. 8B, the pipe portion 132 of the brace 130 is likely to be urged to be deformed to be bent rearward with respect to the vehicle body.

That is, as shown in FIG. 9A, when a bending deformation force F1 that acts rearward with respect to the vehicle body is applied to the pipe portion 132, a tensile force F2 that acts rearward with respect to the vehicle body and inward in the vehicle width direction is applied to both the ends 134 of the pipe portion 132. That is, a component F3 of the tensile force F2 that acts rearward with respect to the vehicle body is applied to both the ends 134 of the pipe portion 132.

Accordingly, as shown in FIGS. 8B and 9B, the brace 130 according to the comparative example is urged to be deformed rearward with respect to the vehicle body to a relatively large degree. Thus, it may become impossible to ensure the rigidity (the axial force) against rearward bending deformation of the brace 130 with respect to the vehicle body. Namely, it may become impossible to ensure the rigidity of the trailing arm bracket 20 in the vehicle width direction. However, in the case of the brace 30 according to this embodiment of the invention, the rigidity thereof can be ensured.

In order to confirm the rigidity of the trailing arm bracket 20, to which the brace 30 according to this embodiment of the invention is mounted, in the vehicle width direction, a shaking test was conducted by shaking the vehicle 12 to which the brace 30 is mounted in the vehicle width direction at the same level as in the comparative example. FIG. 6A shows a state at the beginning of shaking, and FIG. 6B shows a state after the beginning of shaking. As shown in this FIG. 6B, the pipe portion 32 of the brace 30 is restrained from being urged to be deformed to be bent rearward with respect to the vehicle body.

Figure 7A:
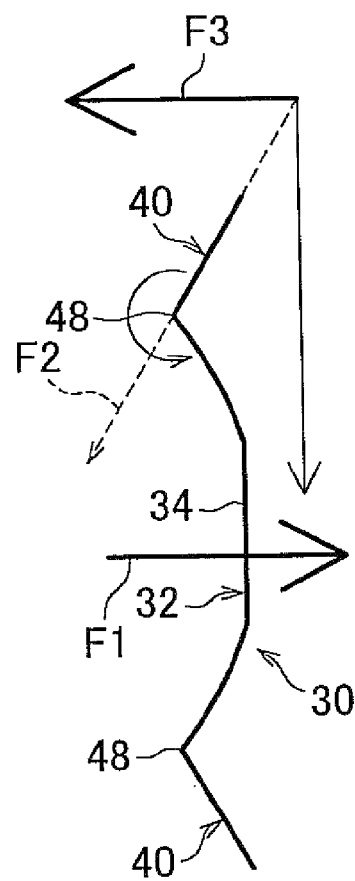
FIG. 7A is an illustrative view showing the directions of forces at the time when the brace according to this embodiment of the invention is urged to be deformed to be bent.

That is, as shown in FIG. 7A, each of the gussets 40 that is fixed integrally to the bent portion 36 of the pipe portion 32 of the brace 30 is formed in a generally V shape in a bottom view in such a manner as to be convex forward with respect to the vehicle body. Thus, when the bending deformation force F1 that acts rearward with respect to the vehicle body is applied to the line portion 34 of the pipe portion 32, an axial rotational force (in the direction toward the line portion 34) around an axis that coincides with the vertical direction with respect to the vehicle body is applied to the top portion 48 of the gusset 40, so that the tensile force F2 that acts inward in the vehicle width direction along the virtual line K2 is applied to the top portion 48 of the gusset 40.

Figure 7B:
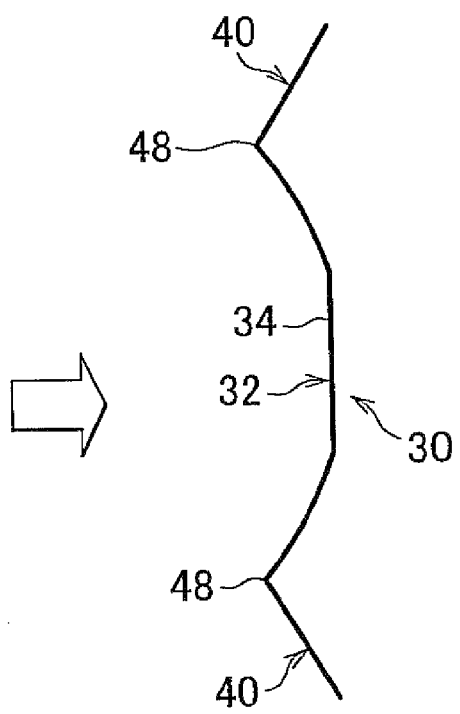
FIG. 7B is an illustrative view schematically showing the brace according to this embodiment of the invention, which is urged to be defaulted to be bent.

That is, the component F3 of this tensile force F2 acts forward with respect to the vehicle body. The bending deformation force F1 that is applied to the line portion 34 and acts rearward with respect to the vehicle body is counterbalanced by the component F3 of the tensile force F2, and is reduced. Accordingly, as shown in FIGS. 6B and 7B, the bending deformation force F1 that is applied to the pipe portion 32 (the line portion 34) of the brace 30 and acts rearward with respect to the vehicle body is reduced, so that the brace 30 can be restrained from being urged to be deformed to be bent rearward with respect to the vehicle body.

In consequence, the rigidity (the axial force) against rearward bending deformation of the brace 30 with respect to the vehicle body can be enhanced, and the rigidity of the trailing arm brackets 20, which are provided on both the sides of the lower portion of the vehicle 12 respectively, in the vehicle width direction can be ensured.

Namely, this brace 30 can relieve the concentration of stress on the trailing arm brackets 20 by an axial force of the pipe portion 32 (the line portion 34) and in-plane forces of the gussets 40. Therefore, the strength performance of the trailing arm brackets 20 can be improved. Concretely, the rigidity can be increased by about 15% in the case of the brace 30 according to this embodiment of the invention, in comparison with the case of the brace 130 according to the comparative example.

Further, as shown in FIGS. 2 and 3, the inner end 42 of each of the gussets 40 in the vehicle width direction includes a corresponding one of the bent portions 36, and is fixed to the pipe portion 32. Thus, when the bent portions 36 are formed at both the ends of the pipe portion 32 respectively and the inner end 42 of each of the gussets 40 in the vehicle width direction is fixed while including a corresponding one of the bent portions 36, the rigidity of the brace 30 against bending deformation can be enhanced in comparison with a configuration in which the inner end 42 of each of the gussets 40 in the vehicle width direction is fixed to the pipe portion (not shown) where the bent portions 36 are not formed.

Furthermore, each of these gussets 40 is configured such that the virtual line K2 that connects the fastening point C1 where the gusset 40 is fastened to the rocker 16 (the rocker inner panel 16A) to the fastening point C2 where the gusset 40 is fastened at the top portion 48 thereof to a corresponding one of the trailing arm brackets 20 intersects with the virtual extension line K3 of a corresponding one of the bent portions 36 that extends outward with respect to the vehicle body. It should be noted herein that the virtual line K2 is a line that is substantially parallel to the direction of shaking.

Accordingly, since the virtual extension line K3 of each of the bent portions 36 of the pipe portion 32 is a line that extends in such a direction as to intersect with (preferably to be substantially perpendicular to) the virtual line K2, the bent portion 36 serves as a resistance member against vibrations transmitted thereto. In consequence, the brace 30 can be restrained from being deformed to be bent rearward with respect to the vehicle body, and the rigidity of the brace 30 against rearward bending deformation with respect to the vehicle body can be enhanced.

To put it the other way around, it is appropriate to adopt a configuration which can restrain the brace 30 from being deformed to be bent rearward with respect to the vehicle body, and in which the virtual extension line K3 intersects with the virtual line K2 to such an extent that the rigidity of the brace 30 against rearward bending deformation with respect to the vehicle body can be enhanced. It is optimal to adopt a configuration in which the virtual extension line K3 is substantially perpendicular to the virtual line K2. However, it is not indispensable to adopt the configuration in which the virtual extension line K3 is substantially perpendicular to the virtual line K2.

Further, in the case where this configuration is adopted, the pipe portion 32 requires the bent portions 36. Therefore, the rigidity of the brace 30 against bending deformation can be enhanced without reducing the capacity of the fuel tank 15. Namely, even when a load is input to the brace 30, it is possible to control the load as described above. Therefore, the brace 30 is suitable as a tank lower brace (a steering stabilizing brace), and the steering stability performance of the vehicle 12 can be improved.

Further, the virtual line K1 that connects the fastening points C3 and C4 where each of the gussets 40 is fastened except at the top portion 48 thereof to a corresponding one of the trailing arm brackets 20 is a line that extends along the vehicle width direction (parallel to the vehicle width direction). Accordingly, when the vehicle 12 runs along a curve, the rigidity of the brace 30 against a load resulting from a centrifugal force received by the rear wheels 14 due to their gripping of the ground can be ensured. Namely, thus, the steering stability of the vehicle 12 can further be enhanced.

Further, each of these gussets 40 has an open cross-section that is open on the lower side with respect to the vehicle body in such a manner as to cover the pipe portion 32 (a corresponding one of the bent portions 36) from above the vehicle body. Accordingly, it is easy to fix each of the gussets 40 to the pipe portion 32 (a corresponding one of the bent portions 36). Especially since both the side edge portions 44 of each of these gussets 40 that are located below the welding portion 38 where the gusset 40 is welded to the pipe portion 32 (a corresponding one of the bent portions 36) with respect to the vehicle body are so formed as to spread radially outward of the pipe portion 32, the welding operation thereof is easy to perform.

Further, each of these gussets 40 has an open cross-section that is open on the lower side with respect to the vehicle body. Therefore, muddy water or the like can be restrained or prevented from entering the gussets 40, and a puddle of muddy water or the like can be restrained or prevented from being formed in the gussets 40. In particular, since both the side edge portions 44 of each of the gussets 40 is so formed as to spread radially outward of the pipe portion 32 as described above, the muddy water or the like that has entered each of the gussets 40 is likely to be discharged.

Furthermore, the wall surface 42A of each of these gussets 40, which covers the pipe portion 32 (a corresponding one of the bent portions 36) is shaped along a contour (the outer peripheral face 36A) of the pipe portion 32 (the corresponding one of the bent portions 36). Accordingly, it is easy to weld each of the gussets 40 to the pipe portion 32 (the corresponding one of the bent portions 36), and the jouncing between each of the gussets 40 and the pipe portion 32 (the corresponding one of the bent portions 36) can be restrained or prevented.

The vehicle lower structure 10 according to this embodiment of the invention has been described above on the basis of the drawings. However, the vehicle lower structure 10 according to this embodiment of the invention is not limited to that shown in the drawings, but can be appropriately changed in design without departing from the gist of the invention. For example, in the case where the brace 30 is not arranged below the fuel tank 15 with respect to the vehicle body, each of the gussets 40 may be formed in a generally V shape in a bottom view in such a manner as to be convex rearward with respect to the vehicle body. In this case, each of the bent portions 36 is bent rearward with respect to the vehicle body, and is extended.

Further, the number of the fastening points C1 to C4 where each of the gussets 40 is fastened to a corresponding one of the trailing arm brackets 20 and a corresponding one of the rockers 16 (a corresponding one of the rocker inner panels 16A) is not limited to four as shown in the drawings, but may be any number equal to or larger than four. However, each of the rockers 16 (each of the rocker inner panels 16A) needs to be provided with at least one fastening point C1. It is desirable to provide each of the trailing arm brackets 20 with at least one fastening point C2 on the virtual line K2 that extends past the fastening point C1 (that is substantially parallel to the direction of shaking).

What is claimed is:

1. A vehicle lower structure comprising:
   a brace that is configured to include an extension portion that extends in a vehicle width direction, and link portions that are provided at both ends of the extension portion respectively and have a generally V shape in a bottom view in such a manner as to be convex forward with respect to a vehicle body; and
   a body portion that is fastened to mounting portions, which are provided on both sides of a lower portion of a vehicle respectively, by the link portions.

2. The vehicle lower structure according to claim 1, wherein
   the body portion is a rocker, and
   the mounting portions are trailing arm brackets.

3. The vehicle lower structure according to claim 2, wherein
   the extension portion is equipped with a linear portion that extends along the vehicle width direction, and bent portions that are bent forward or rearward with respect to the vehicle body at both ends of the linear portion respectively, and
   the link portions include the bent portions, and are fixed to the extension portion.

4. The vehicle lower structure according to claim 3, wherein
   each of the link portions is fastened to the trailing arm bracket at a top portion of the generally V shaped link portion, and
   a virtual extension line of the bent portion that extends outward in the vehicle width direction intersects with a virtual line that connects a fastening point where the rocker is fastened to the link portion to a fastening point where the link portion is fastened at the top portion to the trailing arm bracket.

5. The vehicle lower structure according to claim 4, wherein
   each of the link portions is fastened, at at least two fastening points in addition to the top portion, to the trailing arm bracket, and
   a virtual line that connects the two fastening points to each other extends along the vehicle width direction.

6. The vehicle lower structure according to claim 3, wherein
   the link portions are convex forward with respect to the vehicle body, and
   the bent portions are bent forward with respect to the vehicle body.

7. The vehicle lower structure according to claim 2, wherein
   each of the trailing arm brackets is formed in a generally inverse U shape in a bottom view, and is equipped with a flange portion that bulges in the vehicle width direction, and
   the link portions are fastened to the flange portions.

8. A vehicle lower structure comprising:
   a brace that is configured to include an extension portion that extends in a vehicle width direction, and link portions that are provided at both ends of the extension portion respectively and have a generally V shape in a bottom view in such a manner as to be convex forward or rearward with respect to a vehicle body; and a body portion that is fastened to mounting portions, which are provided on both sides of a lower portion of a vehicle respectively, by the link portions; wherein the link portions are gussets having an open cross-section that is open on a lower side with respect to the vehicle body in such a manner as to cover the extension portion from above.

9. The vehicle lower structure according to claim 8, wherein the gussets are equipped with wall surfaces that cover the extension portion, and the wall surfaces are shaped along a contour of the extension portion.

10. The vehicle lower structure according to claim 1, wherein at least a portion of the brace is arranged below a fuel tank with respect to the vehicle body.

11. A vehicle lower surface comprising:

a brace having an extension portion and a link portion provided on each end of the extension portion, the link portions having a generally V shape, in a bottom view, defined by a forwardmost convex portion and a concave portion, the concave portion positioned between an outer end and an inner end of the link portions;

mounting portions provided on both sides of a lower portion of a vehicle, respectively; and a body portion fastened to the mounting portions by the link portions;

wherein the outer end of the link portions are mounted to the body portion and the inner end of the link portions are mounted to the extension portion.

* * * * *